(12) United States Patent
Scharmüller

(10) Patent No.: US 7,547,035 B2
(45) Date of Patent: Jun. 16, 2009

(54) COUPLING DEVICE FOR TRACTIVE VEHICLES

(76) Inventor: Josef Scharmüller, Saxigen 14, 4892 Fornach (AT)

( * ) Notice: Subject to any disclaimer, the term of this patent is extended or adjusted under 35 U.S.C. 154(b) by 503 days.

(21) Appl. No.: 10/543,939

(22) PCT Filed: Feb. 9, 2004

(86) PCT No.: PCT/AT2004/000042

§ 371 (c)(1),
(2), (4) Date: Aug. 1, 2005

(87) PCT Pub. No.: WO2004/071792

PCT Pub. Date: Aug. 26, 2004

(65) Prior Publication Data

US 2006/0175800 A1 Aug. 10, 2006

(30) Foreign Application Priority Data

Feb. 12, 2003 (AT) .............................. A 213/2003

(51) Int. Cl.
*B60D 1/36* (2006.01)
(52) U.S. Cl. .................. 280/477; 280/507; 280/511
(58) Field of Classification Search .............. 280/477, 280/511, 507, 512, 479.1
See application file for complete search history.

(56) References Cited

U.S. PATENT DOCUMENTS

| | | | | |
|---|---|---|---|---|
| 3,017,200 A * | 1/1962 | Du Shane | ................... | 280/477 |
| 3,479,057 A * | 11/1969 | Miller | ................... | 280/511 |
| 3,503,626 A * | 3/1970 | Lowry et al. | ............. | 280/491.5 |
| 3,522,958 A * | 8/1970 | Lusignan | ................... | 280/511 |
| 3,658,363 A * | 4/1972 | Marler | ................... | 280/511 |
| 3,759,548 A * | 9/1973 | Kothmann | ................... | 280/511 |
| 3,826,517 A * | 7/1974 | Hunter | ................... | 280/511 |
| 3,827,724 A * | 8/1974 | Ackley | ................... | 280/511 |
| 4,148,499 A * | 4/1979 | Johnson | ................... | 280/490.1 |
| 4,176,853 A * | 12/1979 | Brock | ................... | 280/423.1 |
| 4,417,748 A | 11/1983 | Dortch | | |
| 4,564,209 A | 1/1986 | Kingsley et al. | | |
| 4,570,966 A * | 2/1986 | Giboney et al. | ............. | 280/433 |
| 4,792,151 A * | 12/1988 | Feld | ................... | 280/406.2 |
| 4,958,848 A | 9/1990 | Nash | | |
| 5,040,817 A * | 8/1991 | Dunn | ................... | 280/511 |
| 5,224,728 A | 7/1993 | Ball | | |
| 5,257,797 A * | 11/1993 | Johnson | ................... | 280/477 |
| 5,516,139 A | 5/1996 | Woods | | |
| 5,971,493 A * | 10/1999 | Robert | ................... | 298/17 S |
| 5,997,025 A * | 12/1999 | Wisecarver | ................... | 280/508 |

(Continued)

FOREIGN PATENT DOCUMENTS

CA 2216002 4/1999

(Continued)

*Primary Examiner*—Paul N Dickson
*Assistant Examiner*—Maurice Williams
(74) *Attorney, Agent, or Firm*—Henry M. Feiereisen; Ursula B. Day

(57) ABSTRACT

The invention relates to a coupling device (1) for tractive vehicles or similar. Said device comprises a frame (2), a coupling ball (3) and a retaining element (4). According to the invention, the frame (2) is equipped with a guide (21) and a carriage element (5) is displaceably mounted in said guide (21). The coupling operation is carried out by a sliding motion of the carriage element (5).

22 Claims, 6 Drawing Sheets

U.S. PATENT DOCUMENTS

| | | |
|---|---|---|
| 6,386,572 B1 | 5/2002 | Cofer |
| 6,428,030 B2 * | 8/2002 | Melesko et al. ............. 280/477 |
| 7,264,260 B2 * | 9/2007 | Overstreet ............... 280/490.1 |
| 2003/0006581 A1 | 1/2003 | Moss et al. |
| 2004/0145151 A1 * | 7/2004 | Grinde et al. ............ 280/438.1 |

FOREIGN PATENT DOCUMENTS

| | | |
|---|---|---|
| DE | 28 52 773 A1 | 6/1980 |
| EP | 0 016 317 A1 | 10/1980 |
| EP | 0 155 338 A1 | 9/1985 |
| EP | 0640502 | 3/1995 |
| EP | 0 843 956 A1 | 5/1998 |
| EP | 1 138 529 A1 | 10/2001 |
| EP | 1160105 | 12/2001 |
| EP | 1 216 856 A2 | 6/2002 |
| EP | 1216856 | 6/2002 |

* cited by examiner

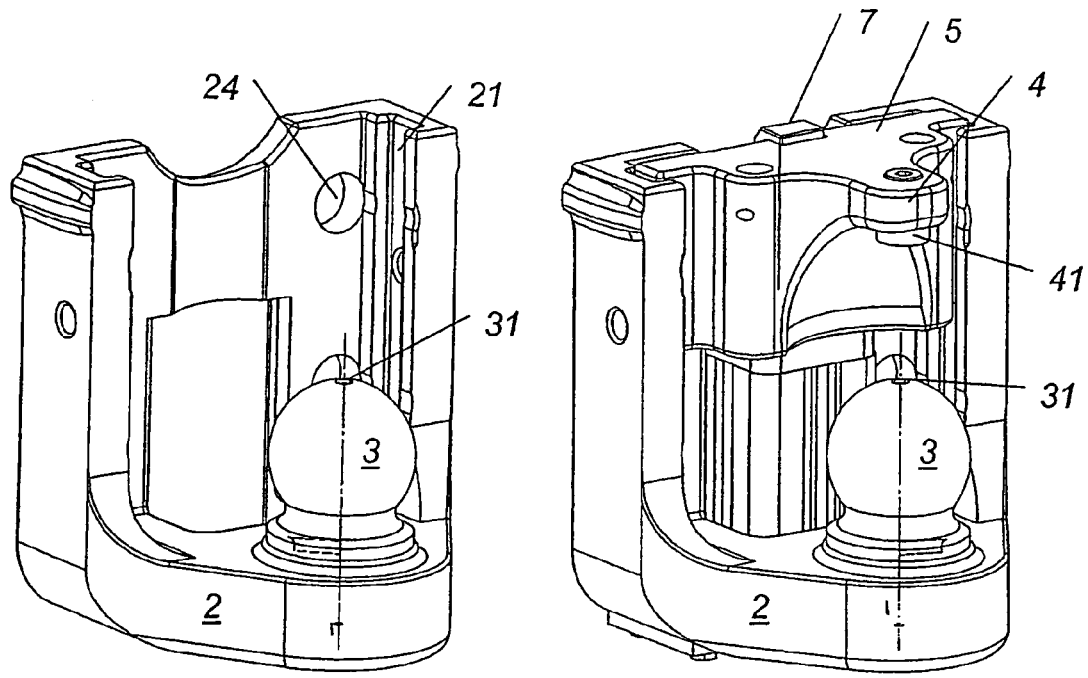
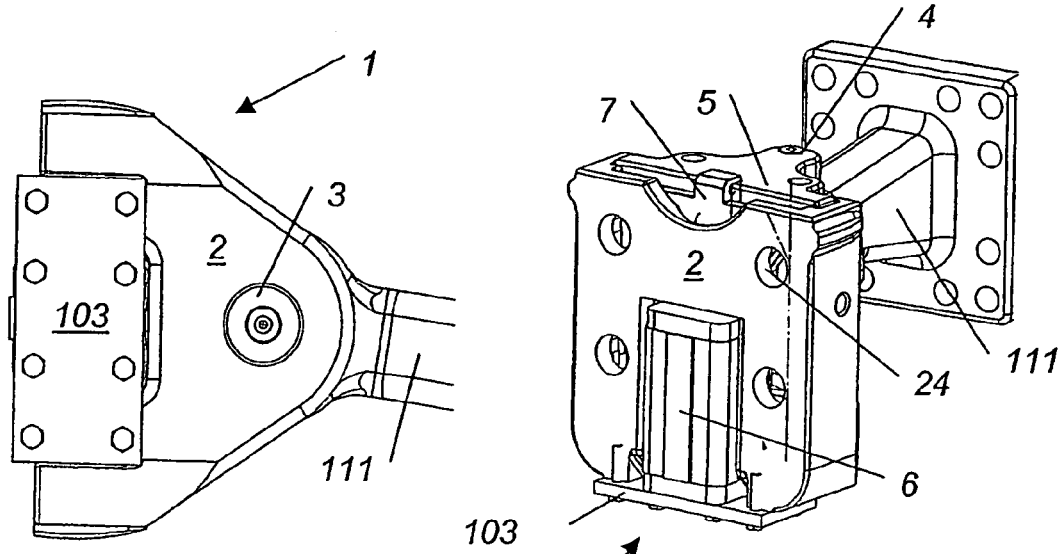

COUPLING DEVICE FOR TRACTIVE VEHICLES

The invention relates to a coupling apparatus for tractive vehicles or the like with a frame element, a coupling ball and a retaining element.

Such known coupling apparatuses comprise a swiveling retaining element which can be swiveled from the opened position to a closed position. The disadvantageous aspect in such known coupling apparatuses is that during the coupling process very high tension peaks can occur in the region of the contact surface of the retaining element with a drawbar eye, thus leading to undesirable permanent deformations of the retaining element in the region of the contact surface. Such permanent deformations lead to an increased wear and tear of the retaining element and/or the drawbar eye, thus increasing the play between the coupling apparatus and the drawbar eye and reducing the stability of the tractive vehicle and the coupled vehicle. Moreover, shorter maintenance cycles are necessary as a result of the deformations.

A further disadvantage of the known coupling apparatuses is that high forces need to be provided for the coupling process and/or in the coupled state because the contact surface of the retaining element is spaced farther from the swiveling axis than the closing mechanism and/or the securing mechanism.

Known coupling apparatuses for trucks comprise a pin which can be brought into engagement with a ring-shaped coupling element of a drawbar eye. Oscillations can occur in such coupling apparatuses as a result of the design-induced play between the pin and the coupling element, thus reducing the stability of the tractive vehicle and a trailer and leading to accidents.

It is the object of the present invention to provide a coupling apparatus of the kind mentioned above in which the known disadvantages are avoided, with which high forces can be transmitted, which allow a favorable guidance of the moved parts, which can be produced easily and in a compact fashion, in which the movable parts can be arranged in the best protected way and in which there is the most even distribution of tension in the contact surface of the retaining element during the coupling process.

It is a further object of the invention to provide a coupling apparatus of the kind mentioned above which can be used in trucks.

This is achieved in accordance with the invention in such a way that the frame element comprises a guide and that a carriage element is displaceably mounted in said guide, with the coupling process being carried out by a displacement of the carriage element.

This leads to the advantage that a drawbar eye is moved at least approximately in a linear fashion during the coupling process, thus ensuring that the coupling apparatus comes into engagement with the drawbar eye with the entire contact surface of the retaining element, which thus helps avoid undesirable tension peaks substantially in a region of the contact surface. In this embodiment, an actuating mechanism can be arranged protected in a simple manner behind and/or in the plane of the carriage element, because the forces required for the movement of the carriage element do not arise from the lever principle.

It can be provided for in a further development of the invention that the carriage element can be actuated by means of an actuating apparatus which is connected with the frame element and/or the tractive vehicle or the like. The actuating apparatus can be arranged protected in a simple way, which thus substantially prevents any unintentional damage to the actuating apparatus and helps to achieve a simple, compact and reliable configuration.

According to another embodiment of the invention it can be provided that the actuating apparatus is formed in a hydraulic and/or pneumatic way. The forces required for the actuating apparatus can thus be provided in a simple way. The actuating apparatus can be connected to existing lines, which thus enables retrofitting of tractive vehicles or the like with a coupling apparatus in accordance with the invention in a cost-effective way.

According to a further configuration of the invention it can be provided that the frame element comprises adjustable stops for the carriage element. The adjustable stops allow the coupling apparatus to be adapted rapidly for different applications. Furthermore, production tolerances and the like can be compensated, which thus allows tolerating higher production tolerances.

It can be provided for in a further development of the invention that an actuating element is joined to the actuating apparatus and the actuating element is at least partly movably connected with the carriage element in the direction of movement of the carriage element. The additional movement of the actuating element relative to the carriage element can be used for the guidance of an additional movement, as a result of which several components can be moved by means of the actuating apparatus.

According to a further embodiment of the invention it can be provided that the actuating element comprises guide means, especially guide grooves, at least one locking element is connected with the guide means, which locking element is held in the carriage element in a displaceable manner in the same transversally to the direction of movement of the carriage element. A mechanical locking of the carriage element in the coupled state can be achieved in a very simple way, which represents in particular a protection from failure by the actuating apparatus. It can also be provided that the actuating apparatus is unloaded in the coupled state, with the carriage element being held by the locking element in the coupled state.

In this connection it can be provided for in a further development of the invention that the guide means is arranged in an inclined manner relative to the direction of movement of the carriage element and that at the outer end there is arranged a securing means, especially a securing groove or the like. With a linear movement of the actuating element and the actuating apparatus, the guidance of the carriage element and the locking elements can thus be ensured with a low number of moved parts. Any inadvertent opening of the locking elements can be prevented effectively by means of the securing means.

It can be provided for in a further development of the invention that a locking spring is provided which acts upon the carriage element and/or the actuating element in the direction of the coupled position. The locking spring can be provided as an additional securing element. It is especially possible to achieve an increase in the reliability of the securing means which is configured as a securing groove.

In accordance with another embodiment of the invention it can be provided that a manually actuateable actuating means is provided which acts with the carriage element and/or the actuating element. This ensures that even in the case of a failure of the actuating apparatus a coupling process can be performed and a drawbar eye can be coupled with and/or detached from the coupling apparatus in accordance with the invention.

In accordance with another embodiment of the invention it can be provided that a self-locking lever element is provided which acts with the carriage element and/or the actuating element. A further mechanical securing of the coupling apparatus can be provided in a simple manner by means of the lever element, with the lever element being connectable especially with the manually actuated actuating means.

It can be provided for in a further embodiment of the invention that the lever element is connected with the carriage element and/or the actuating element by means of brackets, with the bracket comprising at least one oblong hole. The mechanical securing by the lever element can thus be achieved in an especially simple way by this configuration of the bracket.

Another embodiment of the invention can be that the retaining element is connected integrally with the carriage element. In this integral configuration of the retaining element with the carriage element it is possible to produce the coupling apparatus in accordance with the invention in an especially compact way, with the retaining element being capable of absorbing high forces.

In a further development of the invention it can be provided that a catch mouth with at least two catch mouth parts is provided, which catch mouth is divided in the direction of movement of the carriage element. It is thus sufficient when the drawbar eye is swiveled such that only a part of the catch mouth is moved, which thus allows achieving a large opening angle for the drawbar eye in a simple way.

In this connection it can be provided for in a further development of the invention that the carriage element comprises off-center fastening means for the rotatable fastening of the catch mouth parts. As a result of the off-center fastening of the catch mouth parts, it is possible to ensure a favorable transmission of forces from the contact surface of the retaining element via the carriage element to the frame element. The region of the retaining element and/or the carriage element which is loaded most strongly can be kept free from fastening openings.

According to another embodiment of the invention it can be provided that at least one stop or the like is provided for limiting the movement of the catch mouth parts in the direction of the respective other catch mouth part. The movement of the catch mouth parts can thus be limited in a very simple way and undesirable oscillations or the like can be suppressed. If the catch mouth parts are connected with a spring element or the like, the catch mouth parts automatically assume a central idle position.

In a further development of the invention it can be provided that a securing device is provided which blocks the movement of the carriage element at predetermined positions of the catch mouth, which thus suppresses any uncoupling in the case of a strongly swiveled drawbar eye with which the coupling apparatus in accordance with the invention could be damaged.

In a further embodiment of the invention it can be provided that holding jaws or the like are formed which act on the frame element with the catch mouth in the opened position of the coupling apparatus. The catch mouth can be fixed in the opened position in a simple manner by the holding jaws. Additional moved components are not required.

According to another embodiment of the invention it can be provided that the retaining element comprises a retaining member, especially a retaining screw or the like. The retaining member represents a wearing part, as a result of which the maintenance and/or service costs can be kept at a low level. Moreover, the retaining member can be connected adjustably with the retaining element, thereby ensuring a rapid and simple adjustment of the retaining element.

In this connection it can be provided for in a further development of the invention that the retaining member is spring-loaded, as a result of which a drawbar eye is pressed with a predetermined minimum force against the coupling ball and the drawbar eye can be held in a virtually play-free manner in the coupling apparatus in accordance with the invention.

In accordance with a further embodiment of the invention it can be provided that the coupling ball is screwed together with the frame element. The screwed joint ensures a favorable introduction of forces from the coupling ball to the frame element and a secure hold of the coupling ball in the frame element.

According to another embodiment of the invention it can be provided that the retaining member and/or the coupling ball comprise a lubricating opening. The lubricating opening allows keeping wear and tear at a low level, as a result of which it is possible to increase the service life of the components of the coupling apparatus in accordance with the invention. Moreover, lubrication can reduce the likelihood of failure of one of the components, especially by friction welding.

The invention further relates to a method for closing a coupling apparatus for tractive vehicles or the like, especially one of the above coupling apparatuses.

It is the object of the invention to provide a method of the kind mentioned above in which the known disadvantages are avoided, in which the moved parts are guided securely, and which represents a simple, rapid and reliable coupling process.

This is achieved in accordance with the invention in such a way that a carriage element is displaced from an opened position to a coupled position in a guide of a frame element by means of an actuating element connected with an actuating apparatus and that locking elements are actuated by means of guide means arranged on an actuating element and the carriage element is locked relative to the frame element.

This leads to the advantage that by means of the actuating apparatus the locking elements are actuated in addition to the carriage element, which thus enables a compact configuration of the coupling apparatus. Moreover, the sequence and the interaction of the movement of the carriage element and the locking elements are secured in a simple manner.

In a further development of the invention it can be provided that the movement of the catch mouth in the opened position is limited by holding jaws or the like which are joined with the frame element. This can ensure a fixing of the catch mouth in the opened state without any additional moved parts.

The invention further relates to the coupling apparatus for tractive vehicles or the like with the frame element, the coupling ball and the retaining element.

It is the object of the present invention to provide a coupling apparatus of the kind mentioned above in which the known disadvantages are avoided, in which there is the most even distribution of tension in the contact surface of the retaining element during the coupling process, and in which the lowest possible movement of the drawbar eye is required during the coupling process and which can also be used for trucks.

This is achieved in accordance with the invention in that the coupling ball is connected with a swiveling element.

This leads to the advantage that the coupling ball can be swiveled into the drawbar eye. The position of the drawbar eye can be kept approximately constant during the coupling process. Moreover, in an embodiment with a catch mouth, the same can be kept immobile during the coupling process.

The invention is now explained in closer detail by reference to the enclosed drawings showing the embodiments, wherein:

FIG. 10 show an oblique view of the frame element of another embodiment of the coupling apparatus with coupling ball in accordance with the invention;

FIG. 11 shows an oblique view of the coupling apparatus in accordance with the invention with the frame element according to FIG. 10;

FIG. 12 shows a view from below of the coupling apparatus according to FIG. 11 with coupled drawbar eye;

FIG. 13 shows an oblique view from behind of the coupling apparatus according to FIG. 12;

Figure 1:
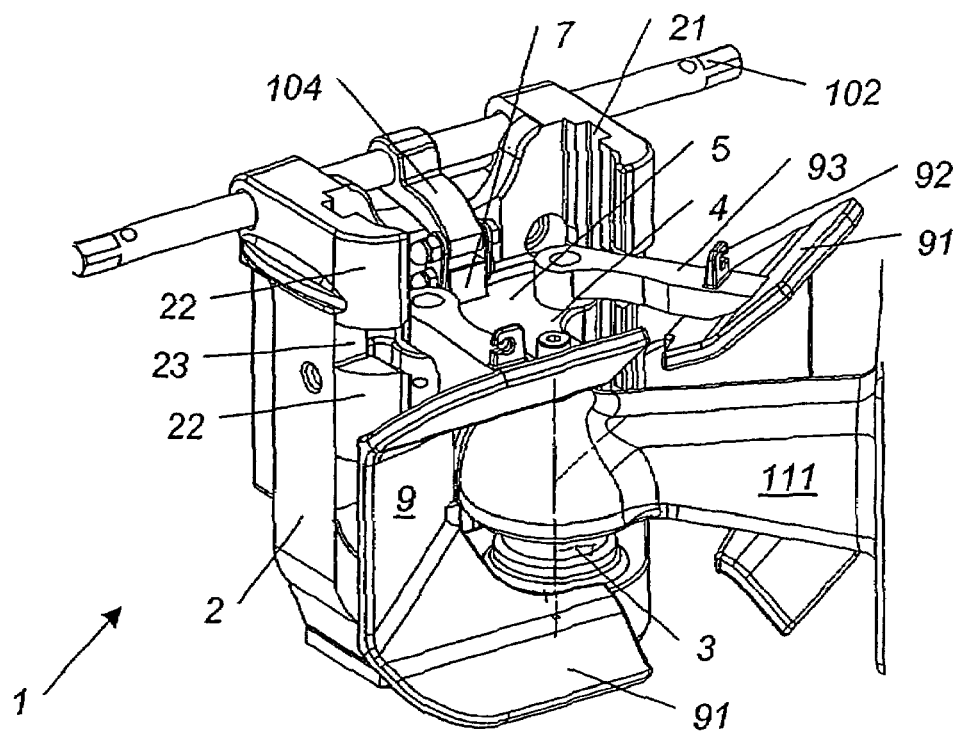
FIG. 1 shows an embodiment of a coupling apparatus in accordance with the invention in an oblique view with the drawbar eye.
Figure 2:
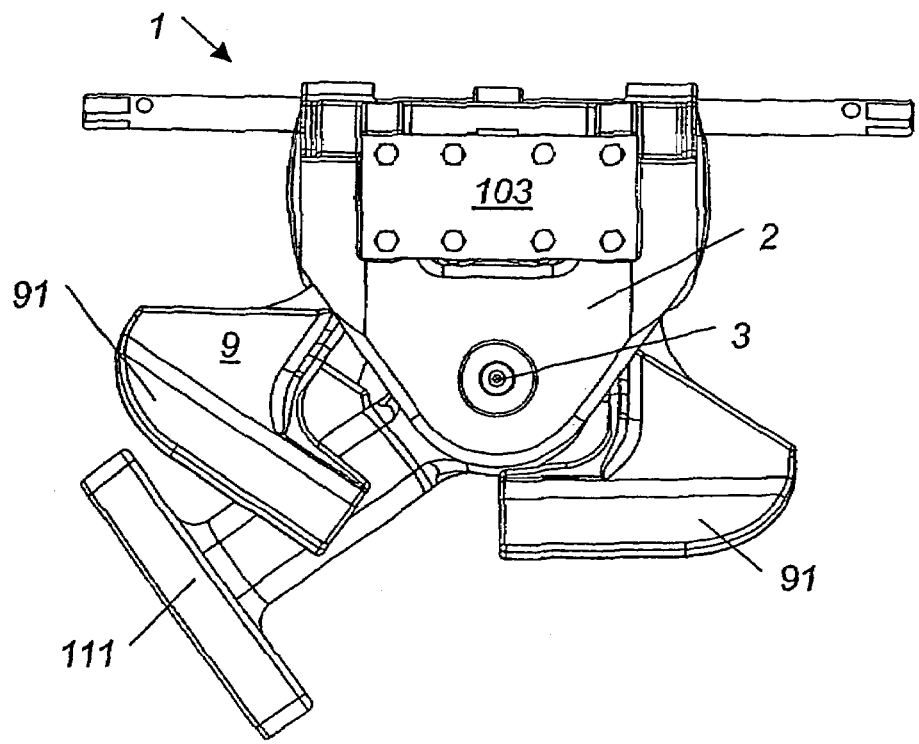
FIG. 2 shows a view from below onto the coupling apparatus according to FIG. 1.

FIGS. 1 and 2 show an embodiment of a coupling apparatus 1 in accordance with the invention for tractive vehicles or the like, comprising a frame element 2, a coupling ball 3 and a retaining element 4, with the frame element 2 comprising a guide 21 and a carriage element 5 being displaceably held in the guide 21.

The guide 21 allows the carriage element 5 to be displaced in a substantially linear movement from an opened position to a coupled position. As is shown in FIG. 1, the retaining element 4 can be joined to the carriage element 5. The coupling ball 3 can also be connected with the carriage element 5 in another embodiment of the coupling apparatus 1 in accordance with the invention. If a drawbar eye 111 to be coupled is also guided during the movement of the carriage element 5, an especially reliable guidance of the drawbar eye 111 can be achieved by the linear movement. The direction of movement of the carriage element 5 during the movement from the opened position to the closed position is preferably substantially normal to the longitudinal axis of the drawbar eye 111.

The coupling apparatus 1 as shown in FIGS. 1 and 2 comprises a catch mouth 9 which has a split configuration and comprises two catch mouth parts 91. There can also be more than two catch mouth parts 91 in other embodiments. The catch mouth 9 is split in the direction of movement of the carriage element 5. When the drawbar eye 111 is swiveled in the coupled position, the maximum swiveling angle of drawbar eye 111 can be increased in such a way that one each of the catch mouth parts 91 is swiveled, whereas the respective other catch mouth part 91 can remain in an idle position. This can simply be achieved in such a way that a stop or the like is provided for limiting the movement of the catch mouth part 91 in the direction of the respective other catch mouth part 91.

Figure 9:
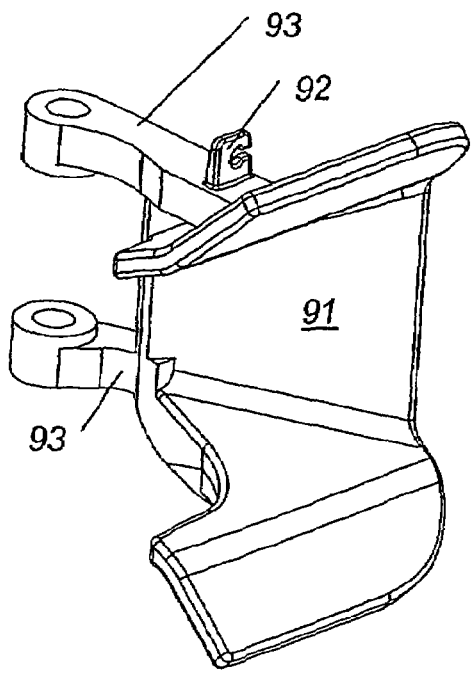
FIG. 9 shows an oblique view of a catch mouth part of the coupling apparatus according to FIG. 1.

The catch mouth parts 91 further each comprise fastening means 92 which can be connected by means of a spring element 94 or the like. This can help achieve that the catch mouth parts 91 are arranged adjacent to one another in the unloaded state and are arranged in a central position. FIG. 9 shows an oblique view of the catch mouth part 91.

As is shown in FIG. 1, the catch mouth parts 91 can be connected with the carriage element 5, with the carriage element 5 having off-center fastening means 51 for the rotatable fastening of the catch mouth parts 91. Local tension peaks occur in the region of the fastening means 51. As a result of the off-center arrangement, the fastening means 51 can be arranged in less stressed regions of the carriage element 5. A compact configuration of the carriage element 5 with a low required installation depth can be achieved in particular.

The catch mouth 9 is used for ensuring a guidance of the drawbar eye 111 into the position above the coupling ball 3 when the drawbar eye 111 approaches the coupling apparatus 1 in accordance with the invention. For this purpose it is necessary that the catch mouth 9 is substantially not swivelable in the opened position. This can be ensured in a simple way by forming holding jaws 22 or the like on the frame element 2, which holding jaws act with the catch mouth 9 in the opened position. The holding jaws 22 can also be connected with the tractive vehicle or the like in another embodiment of the invention. In the opened position the holding jaws 22 are arranged with fastening arms 93 of the catch mouth parts 91 in a normal plane relative to the rotational axis of the catch mouth parts 91, which thus prevents a swiveling of the catch mouth parts 91. In the coupled state a swiveling capability of the drawbar eye 111 is often desirable. This can be achieved by the rotatable fastening of the catch mouth parts 91, with the holding jaws 22 not acting with the fastening arms 93 in the coupled position. It can be provided for this purpose that the holding jaws 22 comprise respective recesses 23.

During the movement of the carriage element 5 from the coupled position to the opened position in a catch mouth 91 swiveled from the unloaded position, the movement of the fastening arm 93 is prevented by the holding jaws 22, which thus might lead to damage to the coupling apparatus. Such damage can be avoided in such a way that a securing device is provided which blocks the movement of the carriage element 5 at predetermined positions of the catch mouth 9. The movement of the carriage element 5 is blocked when the swiveling of the catch mouth 9 exceeds a predeterminable angle.

Figure 5:
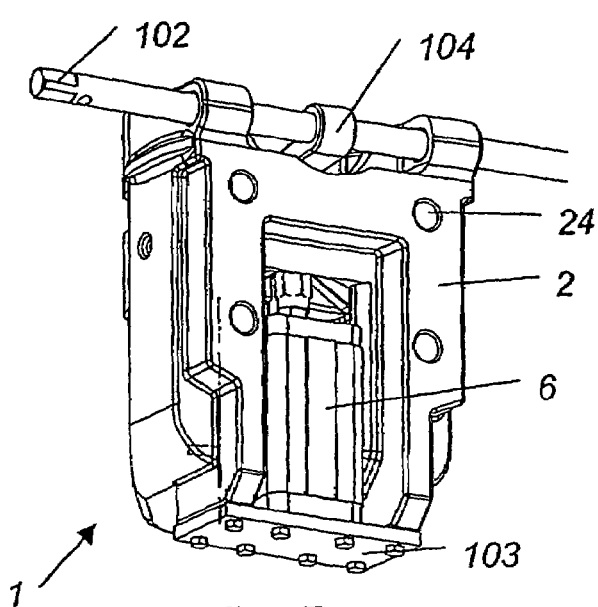
FIG. 5 shows an oblique view from behind of the coupling apparatus according to FIG. 3.
Figure 6:
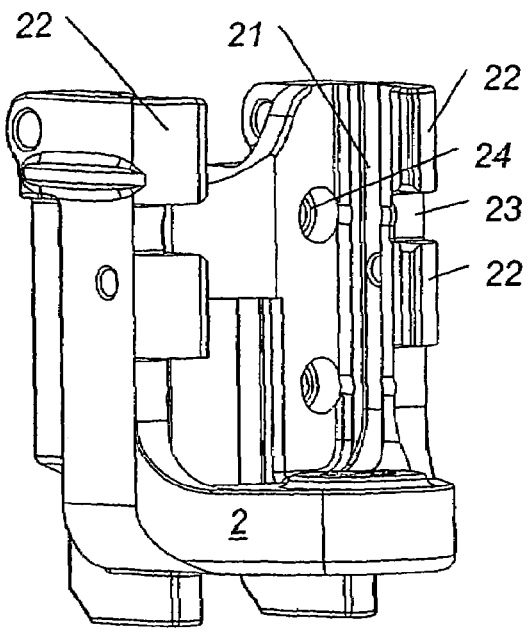
FIG. 6 shows an oblique view of the frame element of the coupling apparatus according to FIG. 1.

FIGS. 3 through 9 show the coupling apparatus 1 in accordance with the invention without catch mouth 9. FIGS. 9 to 11 show a further embodiment of the coupling apparatus 1 without catch mouth 9, with the frame element 2 being configured without holding jaws 22. An improved accessibility of the coupling apparatus 1 can be achieved insofar as a guidance of the drawbar eye 111 is not necessary during the approach to the coupling apparatus 1. FIG. 6 shows an embodiment of the frame element 2 with holding jaws 22 and FIG. 10 shows an embodiment of the frame element 2 without holding jaws 22.

Figure 3:
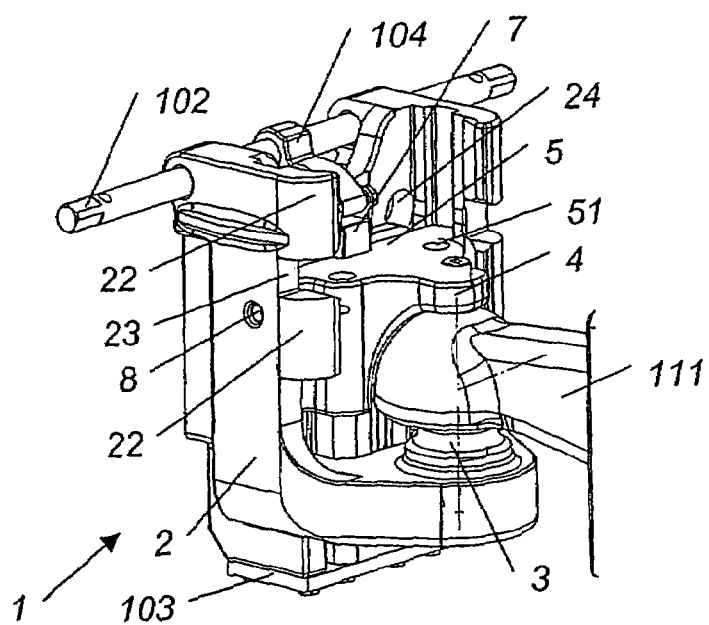
FIG. 3 shows an oblique view of the coupling apparatus according to FIG. 1 with remote catch mouth.
Figure 4:
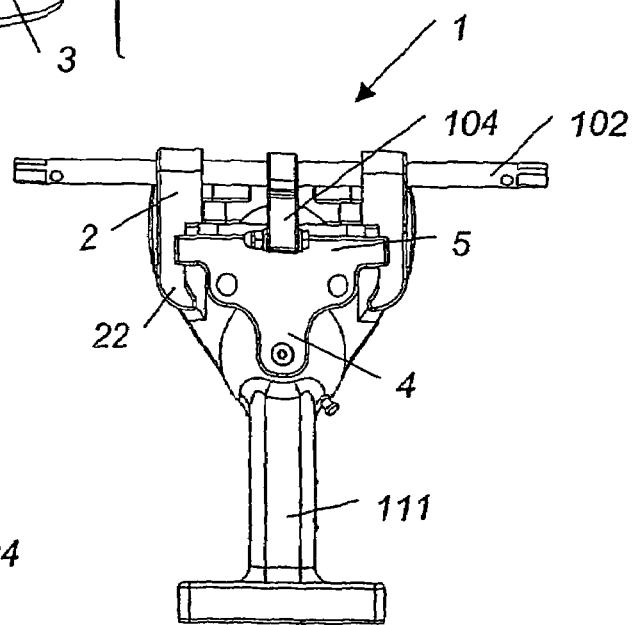
FIG. 4 shows a top view of the coupling apparatus according to FIG. 3.

FIG. 3 shows the carriage element 5 in the coupled position and FIG. 11 shows the same in the opened position.

A rapid and secure actuation of the carriage element 5 is achieved when the carriage element 5 can be actuated by means of an actuating apparatus 6 which is connected with the frame element 2 and/or the tractive vehicle or the like. An embodiment of the actuating apparatus 6 is shown in FIG. 5. A hydraulic and/or pneumatic configuration of the actuating apparatus 6 seems to be especially beneficial. The actuating apparatus can be connected with the hydraulic and/or pneumatic systems which are usually provided for in tractive vehicles. Power for the actuating apparatus 6 can be provided in a simple and cost-effective way.

A reliable limitation of the path of displacement of the carriage element 5 in the guide 21 can be achieved when the frame element 2 comprises adjustable stops for the carriage element 5. An adjustment for different applications and/or for deviating dimensions of the components can be ensured.

Figure 8:
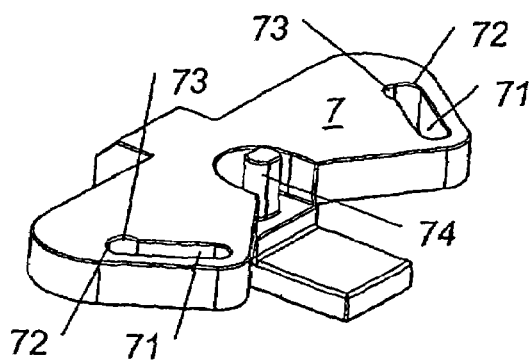
FIG. 8 shows an oblique view of the actuating element of the coupling apparatus according to FIG. 1.

An actuating element 7 can be connected with the actuating apparatus 6, with the actuating element 7 being connected at least partly movable with the carriage element 5 in the direction of movement of the carriage element 5. FIG. 8 shows an embodiment of the actuating element 7 which can be connected with the actuating apparatus 6 by means of pin 74. Moreover, the actuating element 7 comprises guide means 71 which are configured as guide grooves. At least one locking element 8 which is held in the carriage element 5 transversally to its direction of movement and displaceably relative to the same can be connected with the guide means 71. The locking element 8 is shown in FIG. 3 in the guide of the carriage element 5.

The guide element 71 is arranged inclined to the direction of movement of the carriage element 5. A securing means 73 is provided at a one outer end 72 of the guide means 71, which securing means can be configured as a securing groove. In the movement of the carriage element 5 from the opened position to the coupled position the actuating element 7 can be moved further when the carriage element 5 is situated in the coupled position, with the locking element 8 being actuated and mechanically locking the carriage element 5. When the carriage element 5 is moved from the coupled position to the opened position, the locking elements 8 is moved at first by means of the actuating element 7 and then the carriage element 5 is displaced. In this embodiment the movement of the carriage element 5 and its locking can be realized by means of a linear movement of the actuating apparatus 6. The carriage element 5 can also be held in the coupled position by means of a locking spring 106 acting upon the carriage element 5 and/or the actuating element 7 in the direction of the coupled position. The locking spring 106 can also be provided to improve the action of the securing means 73. The securing means 73 ensures that the actuating element 7 is not displaced by the action of force upon the locking elements 8 normal to the direction of movement of the carriage element 5. This effect of the securing means 73 can be ensured by the locking spring 106.

In order to enable the performance of a coupling process during the failure of the actuating apparatus 6, it is possible to provide a manually actuated actuating means 102 which acts in combination with the carriage element 5 and/or the actuating element 7. The actuating means 102 can be configured as a shaft with which a lever element 104 or the like can be connected.

Figure 16:
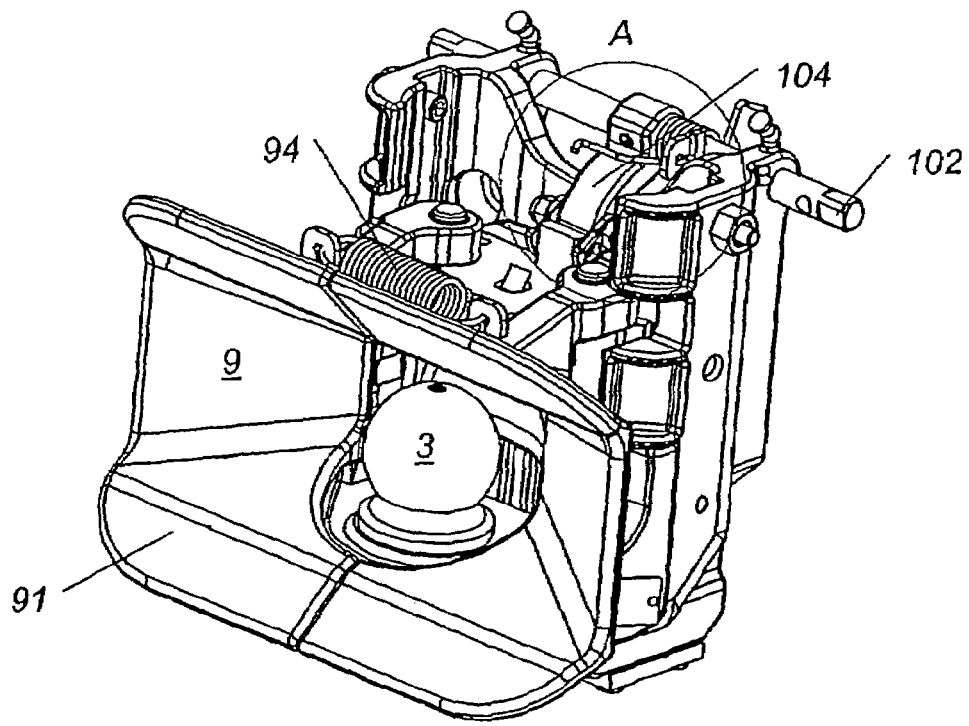
FIG. 16 shows a further embodiment of a coupling apparatus in accordance with the invention in an oblique view.
Figure 17:
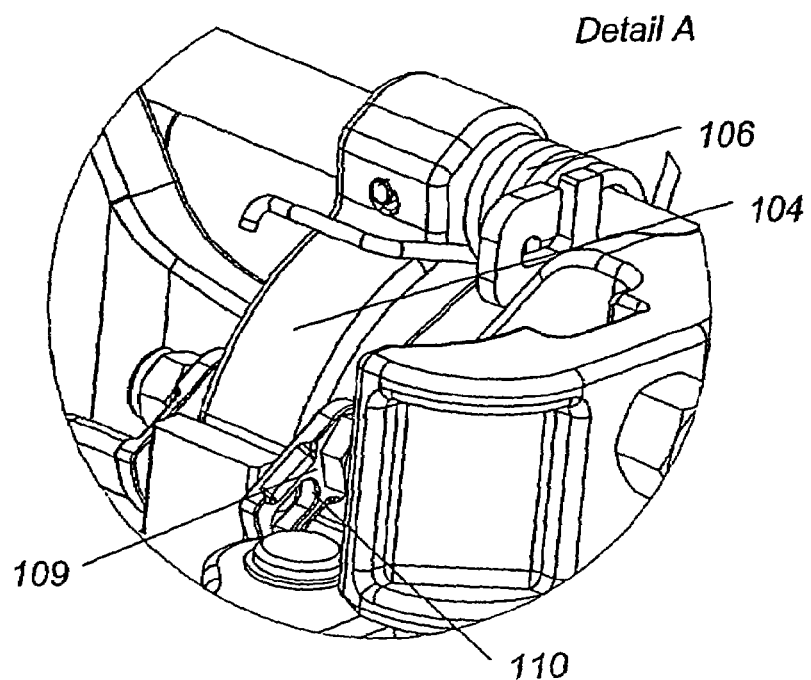
FIG. 17 shows the detail A of FIG. 16.

Further mechanical securing can be provided in a simple manner in such a way that the lever element 104 is self-locking when the coupling apparatus is closed. This can be achieved when the lever element 106 is moved beyond its dead center when the coupling apparatus is closed. This position of the lever element 106, which is shown in FIGS. 16 and 17, can be further secured by means of the locking spring 106. In the case of a failure of the locking element 8, the actuating element 7 will meet the lever element 104 during the movement in the direction towards the opened position, which lever element 104 prevents any movement of the actuating element 7 and the retaining element 4 as a result of the self-locking.

Lever element 104 can be connected with the actuating element 7 and/for the carriage element 5 by means of brackets 109. The movement of the lever element 104 beyond its dead center can be ensured in such a way that the bracket 109 comprises at least one oblong hole. In this way it is possible to move the lever element 104 beyond the dead center even when the actuating element 7 and/or the carriage element 5 are static, at which dead center the points of articulation of the lever element 104 and of the actuating element 7 and/or the carriage element 5 have a minimum distance.

For opening the coupling apparatus it can be provided that the lever element is swiveled by the actuating apparatus 6 beyond the dead center and that the actuating element 7 is only moved thereafter. This can be achieved for example in such a way that the actuating apparatus is connected with the actuating element 7 by means of an oblong hole.

In the illustrated embodiments, the self-locking lever element 104 is connected with the actuating means 102. In other embodiments of the coupling apparatus in accordance with the invention the self-locking lever element 104 can also be provided as a separate component.

Figure 7:
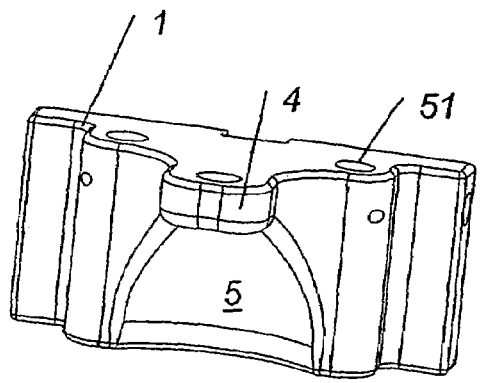
FIG. 7 shows an oblique view of the carriage element of the coupling apparatus according to FIG. 1.

FIG. 7 shows an embodiment of the carriage element 5 which is connected integrally with the retaining element 4, thus allowing achieving an especially favorable progress of the force in the retaining element 4 and the carriage element 5.

As is shown in FIG. 11, the retaining element 4 can comprise a retaining element 41, especially a retaining screw or the like. A retaining screw allows a rapid and quick adjustment of the retaining element 4 to different drawbar eyes 111. In another embodiment the retaining element 41 can be spring-loaded, which thus allows an automatic adjustment to different geometries of the drawbar eyes 111. Moreover, a pretensioning of the retaining element 41 can be provided, which thus allows securing a play-free connection between the drawbar eye 111 and the coupling apparatus 1 in accordance with the invention.

If the retaining element 4 is connected with the carriage element 5, the coupling ball 3 can be screwed together with the frame element 2. The direct connection of the coupling ball 3 with the frame element 2 allows absorbing especially high forces from the coupling ball 3, with the screwed joint ensuring a secure hold of the coupling ball 3 in the frame element 2.

A long service life of the coupling apparatus 1 in accordance with the invention can be achieved in such a way that the retaining element 41 and or the coupling ball 3 comprises a lubricating opening.

Figure 14:
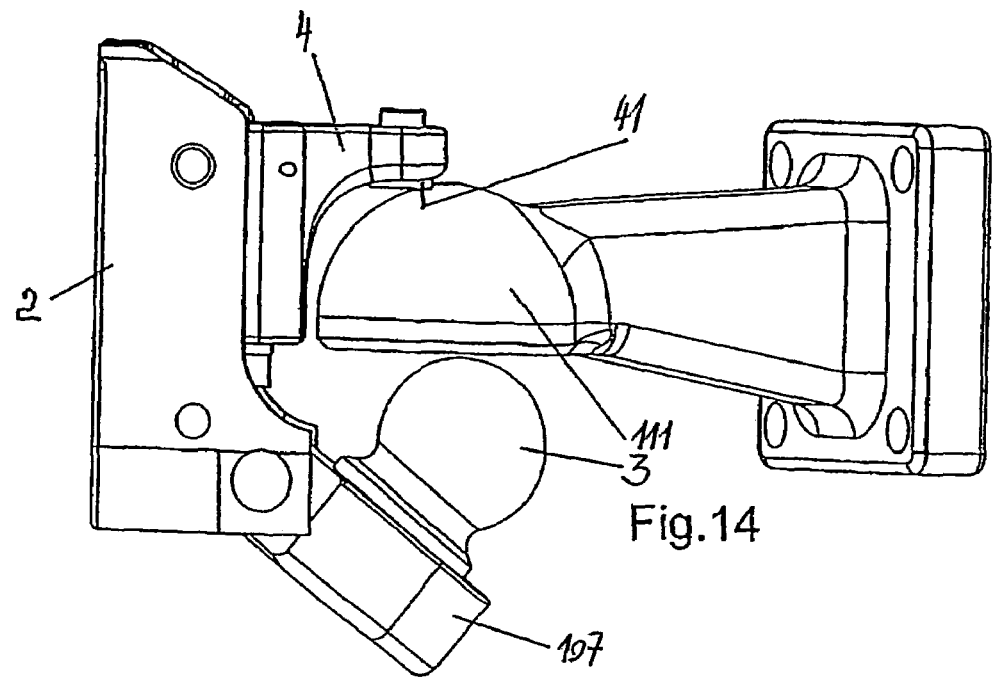
FIG. 14 shows a side view of a further embodiment of a coupling apparatus in accordance with the invention, with the coupling ball being joined to a swiveling element.
Figure 15:
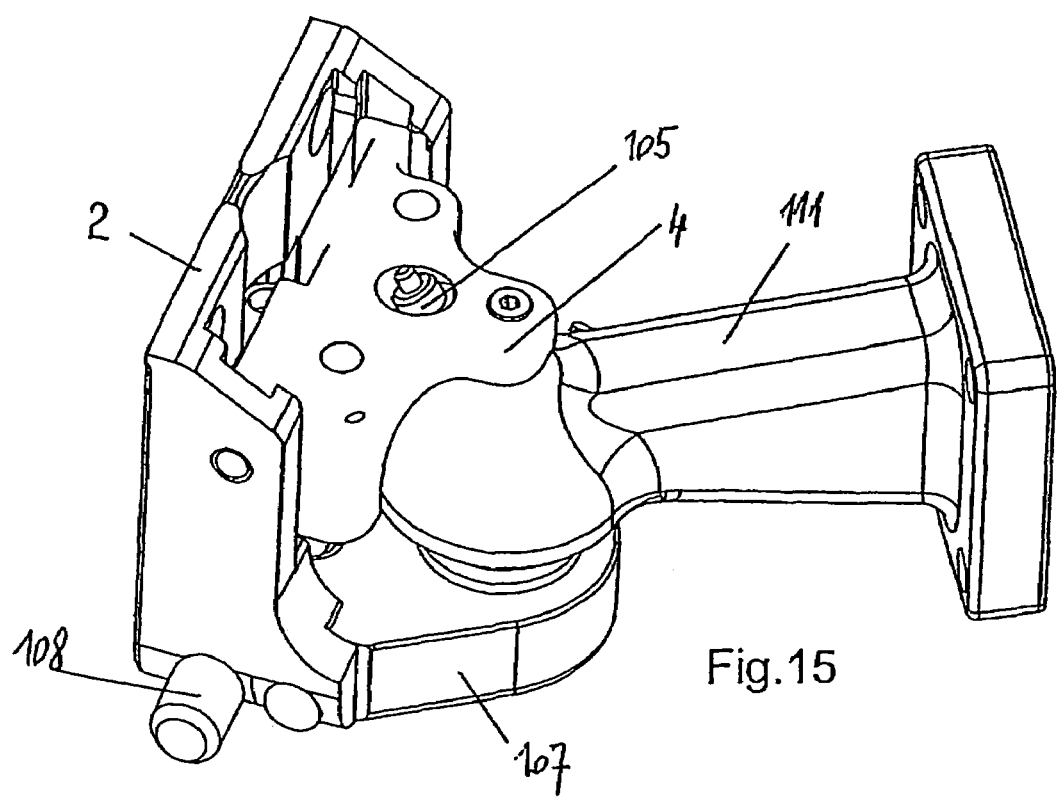
FIG. 15 shows an oblique view of the coupling apparatus according to FIG. 14.

FIGS. 14 and 15 show a further embodiment of a coupling apparatus 1 in accordance with the invention in which the coupling ball 3 is connected with a swiveling element 107. In this coupling apparatus 1, a vertical movement of the drawbar eye 111 is not required during the coupling process, as a result of which the forces occurring during the coupling process as a result of the displacement of the drawbar eye 111 can be kept very low. Conventional catch mouths 9 or the like can be used in particular in this embodiment.

For initiating the coupling process, the coupling apparatus 1 can comprise a detector or the like with which the approach of a drawbar eye 111 can be detected in the region between the coupling ball 3 and the retaining element 4 and optionally the coupling process can be initiated. The detector can be configured as an actuating tongue or as a switch or the like. The detector is configured as a sensor 107 in the coupling apparatus 1 in FIG. 15.

The detector can be connected especially with a control device, which allows configuring the coupling process, the lubrication of the coupling ball 3 and/or the retaining element 4, the adjustment of the retaining element 4 or the like in a substantially automated and/or remote-controlled way.

The retaining element 4 can be connected with the swiveling element 107 in another embodiment of the coupling apparatus 1.

The features shown in the individual embodiment of the coupling apparatus 1 are not limited to the same and can especially also be provided in other described embodiments of the coupling apparatus 1.

The invention claimed is:

1. A coupling apparatus for a tractive vehicle, comprising:
a frame element for securement to the tractive vehicle, said frame element having a guide,
a coupling ball screwed to the frame element for receiving a drawbar eye,
a carriage element displaceably held in the guide for movement from an opened position to a coupled position, said carriage element holding the drawbar eye when assuming the coupled position, and to release the drawbar eye when assuming the opened position, wherein the carriage element operates as guiding element for the drawbar eye, with the movement of the carriage element being realized in a direction substantially normal to a longitudinal axis of the drawbar eye,
a retaining element integrally connected with the carriage element which holds the drawbar eye against the coupling ball,
an actuating apparatus connected to at least one of the frame element and a tractive vehicle for implementing the movement of the carriage element,
an actuating element connected with the actuating apparatus and connected with the carriage element in an at least partly movable way in the direction of movement of the carriage element, and
a self-locking lever element to act together with at least one member selected from the group consisting of the carriage element and the actuating element, wherein the lever element is connected with the member by means of brackets, with each said bracket comprising at least one oblong hole.

2. The coupling apparatus according to claim 1, wherein the actuating apparatus is constructed as a hydraulic or a pneumatic actuating apparatus, or a combination of both.

3. The coupling apparatus according to claim 1, wherein the frame element comprises adjustable stops for the carriage element.

4. The coupling apparatus according to claim 1, wherein the actuating element comprises guide means, wherein at least one locking element is connected with the guide means and held in the carriage element in a displaceable manner transversally to the direction of movement of the carriage element.

5. The coupling apparatus according to claim 4, wherein the guide means is arranged inclined relative to the direction of movement of the carriage element, wherein a securing means is arranged at an outer end of the guide means.

6. The coupling apparatus according to claim 5 wherein the securing means are securing grooves.

7. The coupling apparatus according to claim 4, wherein the guide means are guide grooves.

8. The coupling apparatus according to claim 1, wherein a locking spring is provided to act upon the carriage element and/or the actuating element in a direction of the coupled position.

9. The coupling apparatus according to claim 1, wherein a manually actuated actuating means is provided to act upon the carriage element and/or the actuating element.

10. The coupling apparatus according to claim 1, wherein the retaining element includes a retaining screw.

11. The coupling apparatus according to claim 1, wherein the retaining element is spring-loaded.

12. The coupling apparatus according to claim 1, further comprising a coupling ball screwed together with the frame element, wherein the retaining and/or the coupling ball comprise a lubricating opening.

13. A coupling apparatus for a tractive vehicle, comprising:
a frame element for securement to the tractive vehicle, said frame element having a guide,
a coupling ball screwed to the frame element for receiving a drawbar eye,
a carriage element displaceably held in the guide for movement from an opened position to a coupled position, said carriage element holding the drawbar eye, when assuming the coupled position, and to release the drawbar eye, when assuming the opened position, wherein the carriage element operates as guiding element for the drawbar eye, with the movement of the carriage element is being realized in a direction substantially normal to a longitudinal axis of the drawbar eye,
a retaining element integrally connected with the carriage element which holds the drawbar eye against the coupling ball.
an actuating apparatus connected to at least one of the frame element and a tractive vehicle for implementing the movement of the carriage element; and
a catch mouth with at least two catch mouth parts, said catch mouth being divided in the direction of movement of the carriage element.

14. The coupling apparatus according to claim 13, wherein the carriage element comprises off-center fastening means for rotatably fastening the catch mouth parts.

15. The coupling apparatus according to claim 13, wherein at least one stop is provided for limiting a movement of one of the catch mouth pads in direction of another one of the catch mouth parts.

16. The coupling apparatus according to claim 13, wherein a securing device is provided to block the movement of the carriage element at predeterminable positions of the catch mouth.

17. The coupling apparatus according to claim 13, wherein holding jaws are formed on the frame element and act with the catch mouth in the opened position of the coupling apparatus.

18. The coupling apparatus according to claim 13, wherein the actuating apparatus is constructed as a hydraulic or a pneumatic actuating apparatus, or a combination of both.

19. The coupling apparatus according to claim 13, wherein the frame element comprises adjustable stops for the carriage element.

20. The coupling apparatus according to claim 13, wherein the retaining element includes a retaining screw.

21. The coupling apparatus according to claim 13, wherein the retaining element is spring-loaded.

22. The coupling apparatus according to claim 13, further comprising a coupling ball screwed together with the frame element, wherein the retaining and/or the coupling ball comprise a lubricating opening.

* * * * *